United States Patent
Maier et al.

[11] Patent Number: 5,816,383
[45] Date of Patent: Oct. 6, 1998

[54] INSTALLATION FOR COMMISSIONING OBJECTS

[75] Inventors: Willi Maier, Kloten; Werner Roth, Uster, both of Switzerland

[73] Assignee: GRAPHA-Holding AG, Hergiswil, Germany

[21] Appl. No.: 540,310

[22] Filed: Oct. 6, 1995

[30] Foreign Application Priority Data

Oct. 10, 1994 [CH] Switzerland .................. 03 043/94

[51] Int. Cl.$^6$ ................................................. B65G 47/26
[52] U.S. Cl. ................. 198/460.1; 198/575; 198/370.04
[58] Field of Search .............................. 198/459.1, 459.8, 198/460.1, 461.1, 462.1, 572, 575, 576, 577, 370.04

[56] References Cited

U.S. PATENT DOCUMENTS

| | | | |
|---|---|---|---|
| 3,817,368 | 6/1974 | Wentz et al. | 198/575 X |
| 4,227,607 | 10/1980 | Malavenda | 198/575 X |
| 4,281,756 | 8/1981 | Bruno | 198/575 X |
| 4,355,712 | 10/1982 | Bruno | 198/460.1 X |
| 4,360,098 | 11/1982 | Nordstrom | 198/575 X |
| 5,097,939 | 3/1992 | Shanklin et al. | 198/460.1 X |
| 5,137,139 | 8/1992 | Ruscello | 198/460.1 |
| 5,341,916 | 8/1994 | Doane et al. | 198/460.1 |

FOREIGN PATENT DOCUMENTS

| | | |
|---|---|---|
| 1260830 | 9/1961 | France . |
| 1481438 | 4/1969 | Germany . |
| 2155458 | 5/1973 | Germany . |
| 2427156 | 12/1974 | Germany . |

OTHER PUBLICATIONS

Patent Abstracts of Japan, vol. 7, No.269 (M–259) [1414], 30. Nov. 1983 & JP–A–58 148114, 3. Sep. 1983.

Patent Abstracts of Japan, vol. 7, No. 20 (M–188) [1165], 26 Jan. 1983 & JP–A–57 175616, 28 Oct. 1982.

*Primary Examiner*—James R. Bidwell
*Attorney, Agent, or Firm*—Friedrich Kueffner

[57] ABSTRACT

An installation for sorting or commissioning objects includes at least one transfer or delivery unit with an inlet where the objects arriving from a conveyor can be loaded onto the transfer or delivery unit and an outlet where the objects are discharged, wherein the transfer or delivery unit can be filled between the inlet and the outlet with objects which have been loaded onto the transfer or delivery unit. The transfer unit includes a timed belt in front of the outlet and at least one additional belt arranged in front of the timed belt, wherein at least one object can be positioned on the at least one additional belt for the controlled transfer to the timed belt.

12 Claims, 3 Drawing Sheets

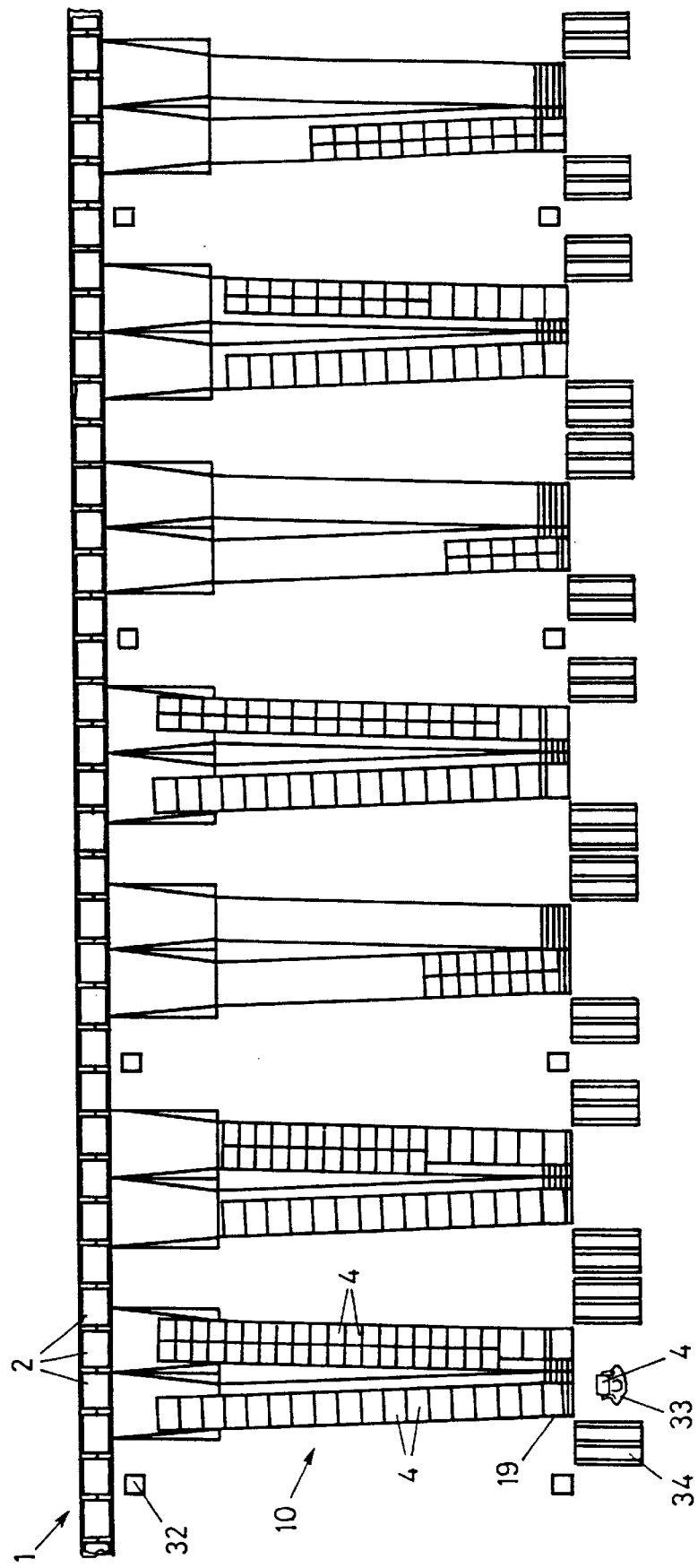

INSTALLATION FOR COMMISSIONING OBJECTS

BACKGROUND OF THE INVENTION

1. Field of the Invention

The present invention relates to an installation for sorting or commissioning objects. The installation includes at least one transfer or delivery unit with an inlet where the objects arriving from a conveyor can be loaded onto the transfer or delivery unit and an outlet where the objects are discharged, wherein the transfer or delivery unit can be filled between the inlet and the outlet with objects which have been loaded onto the transfer or delivery unit.

2. Description of the Related Art

Installations of this type have been used for a long time in distribution centers for sorting goods which are offered and sold in stores. In these installations, the goods are individually thrown by means of a conveyor into the predetermined transfer unit and the goods slide downwardly on the transfer unit as a result of their own weight on a roller conveyor against a stop or against an object which has already been transferred out of the conveyor. The objects introduced into a transfer unit are usually very different, particularly with respect to their weight and fragility. These objects are, for example, packaged glasses, frozen products, boxes with bottles, packaged fruit or packaged paper products. For unloading the transfer unit, the respectively lowermost objects are manually removed from the transfer unit and are transferred to another conveying unit, for example, a conveyor belt.

In these known installations, there is the difficulty that sensitive objects are frequently damaged when they impact on an already transferred object or when they are impacted by a subsequent object. Another disadvantage is seen in the fact that the lowermost objects are frequently jammed and can only be removed with difficulty. Accordingly, in these known installations, unloading was cumbersome and the proportion of damaged objects was high.

SUMMARY OF THE INVENTION

Therefore, it is the primary object of the present invention to provide an installation of the above-described type which avoids at least one of the above-described difficulties.

In accordance with the present invention, the above object is met by providing the transfer unit with a timed belt in front of the outlet and with at least one additional belt arranged in front of the timed belt, wherein at least one object can be positioned on the at least one additional belt for the controlled transfer to the timed belt.

Accordingly, in the installation according to the present invention, the objects are transferred on the transfer unit in a timed manner to the timed belt. The objects can then be conveyed very gently downwardly on the timed belt one behind the other. A stop at the lower end of the transfer unit is no longer required. Even when the timed belt is completely filled, the objects do not contact each other at high pressure; rather, the objects are placed on the timed belt in an orderly manner and loosely next to each other, so that it is much easier than in the past to remove the objects at the lower end of the timed belt or from the rollers following the timed belt. The proportion of damaged objects is significantly lower than in the past, because the objects do not impact against one another, but are individually transferred to the timed belt.

The present invention also relates to a method of sorting different objects by means of at least one transfer unit, wherein the objects are loaded onto the transfer unit at an inlet of the transfer unit and are discharged at an outlet of the transfer unit.

In accordance with the present invention, the method includes the steps of placing the objects on the transfer unit in a predetermined position, further conveying the objects in a timed manner from this position in at least one row closely together for removal.

The method according to the present invention also meets the above-mentioned object. By positioning the objects and subsequently arranging the objects in a timed manner, it is additionally possible to significantly increase the degree of filling of the objects in the transfer unit; in particular, it is possible to position the objects next to each other and, thus, to form at least one double row of objects.

In accordance with a further development of the present invention, a pulling belt is arranged at the inlet of the transfer unit. This results in a particularly efficient operation of the transfer unit. The pulling belt has a strongly adhesive surface, so that any objects thrown onto the pulling belt are conveyed with the same speed as the travel speed of the pulling belt.

In accordance with a preferred further development of the present invention, a braking or decelerating belt is arranged following the pulling belt, wherein the travel speed of the braking belt is significantly slower than the speed of the pulling belt.

The outer surface of the braking belt is preferably significantly less adhesive than the outer surface of the pulling belt. Accordingly, the objects are decelerated on the braking belt, preferably until they reach a standstill on the braking belt. An object positioned at the end of the braking belt can be picked up by the timed belt after actuation of the timed belt. The timed belt is preferably controlled by a light barrier which is capable of determining the presence of an object at the end of the braking belt. The light barrier is additionally capable of determining the length of the object and the timed belt is moved accordingly. Thus, in the case of a long object, the timed belt is moved for a longer period of time for picking up the object than for picking up a shorter object. This makes possible a particularly efficient operation and an optimum filling of the transfer unit.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 6 is a schematic top view of an installation with several transfer units.

DETAILED DESCRIPTION OF THE PREFERRED EMBODIMENTS

Figure 1:
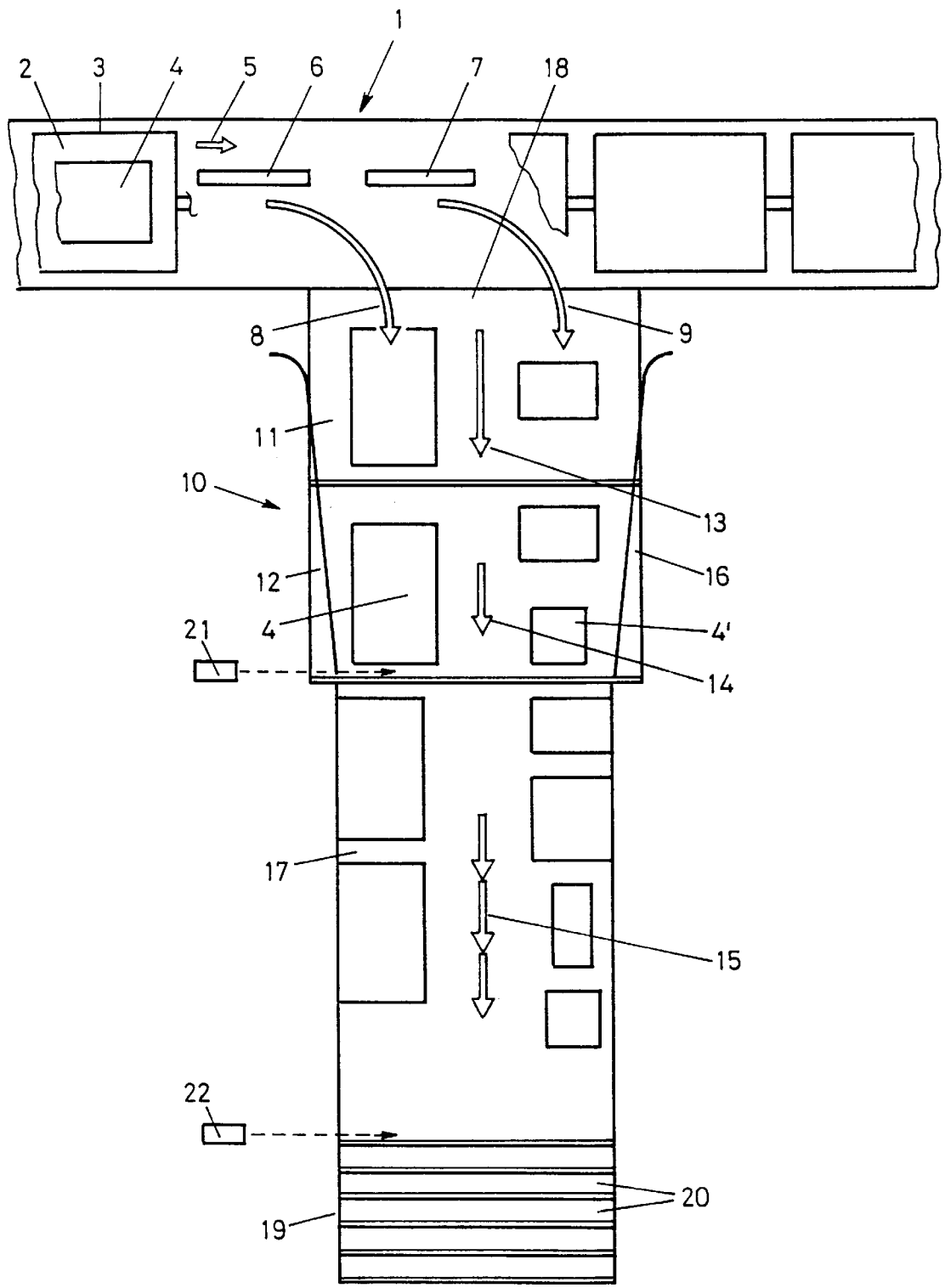
FIG. 1 is a schematic top view of a portion of the installation according to the present invention.

FIG. 1 of the drawing shows a piece good conveyor 1 whose conveying means is composed of a plurality of carriages 2 which are connected to one another in an articulated manner. An object 4 is placed on an essentially horizontal support plate 3 of each carriage 2. By actuating a push member 6, the support plate 3 is tilted and the object 4 is transferred in the direction of arrow 8 onto a transfer unit 10, or by actuating another push member 7, another support plate 3 is tilted and the respective object 4 is transferred in the direction of arrow 9 onto the transfer unit 10. Piece good conveyors of this type are well known in the art. The object 4 may be, for example, a box, a frozen and packaged foodstuff, a household article, or the like.

The transfer unit 10 has an inlet 18 which is arranged laterally next to the conveyor 1 and essentially on the same level as the conveyor 1. Several rollers 20 which form an outlet 19 for the removal of the transferred objects 4 are located at the other end of the transfer unit 10. The outlet 19 is preferably arranged at a lower level than the inlet 18. Successively arranged between the inlet 18 and the outlet 19 are a pulling belt 11, a braking belt 12 and a timed belt 17 on which the objects 4 are conveyed from the inlet 18 to the outlet 19 and which are explained in more detail below.

Figure 2:
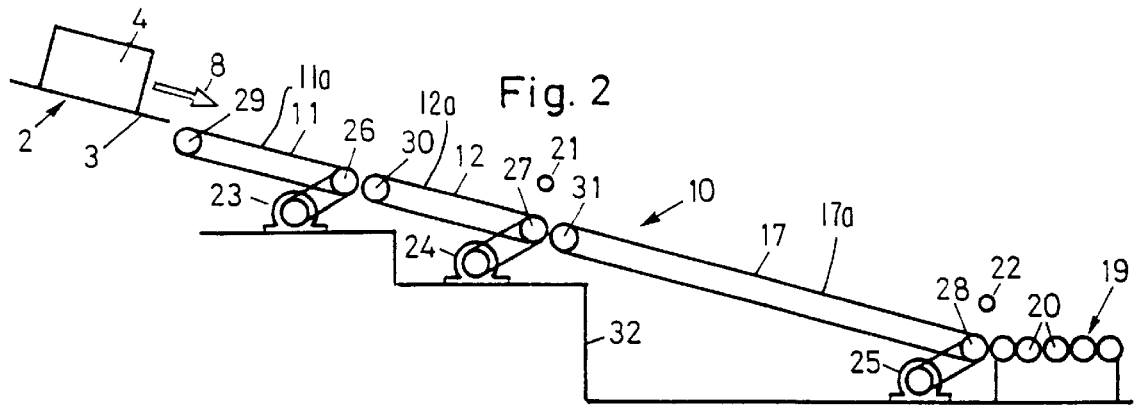
FIGS. 2–5 are schematic side views of the transfer unit of the installation, showing different stages of operation of the transfer unit.

The pulling belt 11 is an endless belt which, as shown in FIG. 2, is placed around a drive roller 26 and a guide roller 29 and is driven by a motor 23. The outer surface 11a of the pulling belt 11 is configured to be relatively strongly adhesive, so that an object thrown onto the pulling belt 11 does not slide on the pulling belt 11 and is driven at the speed of the pulling belt 11. For example, the speed of the pulling belt 11 is 2 m/sec.

Of course, the belt 11 and all other belts are mounted in a frame 32, not illustrated in detail.

The braking belt 12 is arranged immediately adjacent the end of the pulling belt 11 and is also placed around a drive roller 27 and a guide roller 30. The drive roller 27 is driven by a motor 24. However, the belts 11 and 12 can also be driven by a single motor by means of a connecting drive, not shown. The outer surface 12a of the braking belt 12 has sliding properties and, thus, is much less adhesive than the surface 11a of the belt 11. The speed of the braking belt 12 is substantially lower than that of the pulling belt 11; preferably, the speed is slower by a multiple, for example, the speed is 0.5 m/sec. The directions of movement of the two belts are the same and are indicated in FIG. 1 by arrows 13 and 14.

A light barrier 21 is arranged laterally at the end of the braking belt 12 for determining the presence of an object 4 at the level of this light barrier 21. The timed belt 17 is controlled by a control unit, not shown, on the basis of appropriate signals provided by the light barrier 21.

As shown in FIG. 2, the timed belt 17 is placed around a drive roller 28 and a guide roller 31 and is driven by a motor 25. The length of the timed belt 17 is substantially greater than that of the pulling belt 11 and the braking belt 12. The outer surface 17a of the timed belt 17 is preferably less adhesive than that of the pulling belt 11.

Another light barrier 22 is arranged at the end of the timed belt 17 for determining the presence of an object 4 at the end of timed belt 17. Of course, the light barriers 21 and 22 can also be replaced by other suitable barriers, for example, mechanically operated barriers.

The operating sequence of the installation according to the present invention shall now be explained in more detail with the aid of FIGS. 2–5.

FIG. 2 shows a carriage 2 whose support plate 3 has been moved into a predetermined inclined position by means of the push member 6 or the push member 7 for transferring an object 4. As a result of the inclination of the support plate 3, the object 4 slides in the direction of arrow 8 onto the pulling belt 11 and is conveyed toward the right as shown in FIG. 2 with the speed of the belt 11. Because of the high adhesiveness of the belt 11 as mentioned above, the object 4 can be accelerated on the belt 11. An object 4 protruding laterally beyond the belt 11 is aligned by guide walls 16 arranged in a funnel-shaped manner. The pulling belt 11 is preferably driven continuously and with uniform speed.

Figure 3:
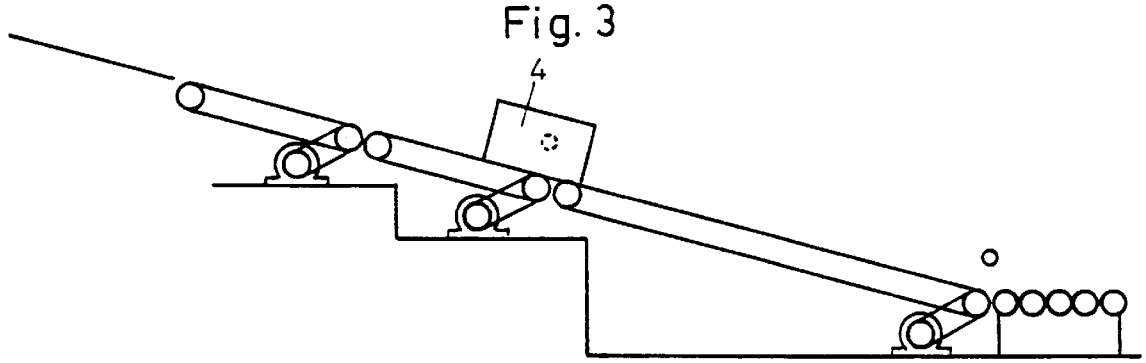

When the object 4 has reached the lower end of the pulling belt 11, the object 4 is transferred onto the braking belt 12 which, as mentioned above, has a relatively slippery outer surface 12a and travels at a substantially slower speed than the pulling belt 11. The object 4 continues to slide on the belt 12 while its speed is being decelerated and the object 4 finally reaches the position shown in FIG. 3. As shown in FIG. 3, the object 4 rests with its front end on the timed belt 17 which stands still at this point in time.

By actuating another push member 7 or 6, another object 4 is transferred and is moved in the same manner by the pulling belt 11 and the braking belt 12 into the position shown in FIG. 3, wherein, however, this additional object is laterally offset and not visible in FIG. 3. In FIG. 1, this additional object is denoted by reference numeral 4'.

Figure 4:
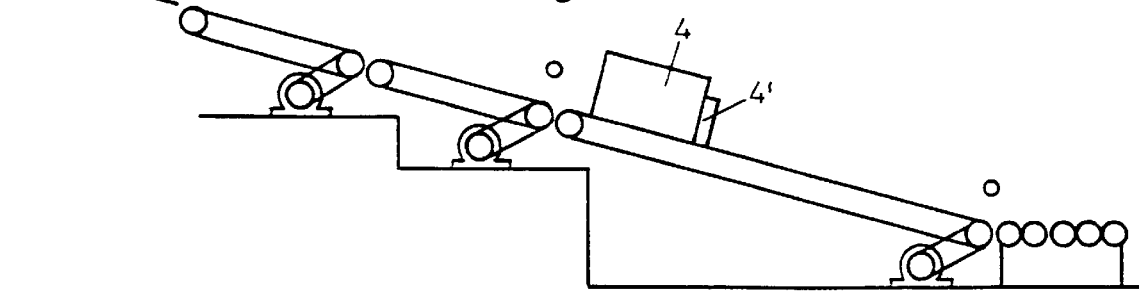
Figure 5:
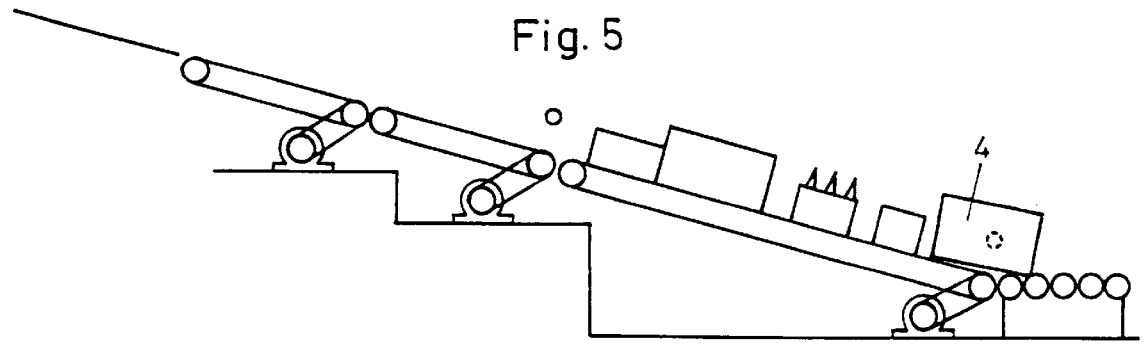

When the light barrier 21 at the end of the braking belt 12 determines that two objects 4 and 4' are present at the end of the braking belt 12 or at the beginning of the timed belt 17, the timed belt 17 is started and the two objects 4 and 4' are completely received by the timed belt 17, as illustrated in FIG. 4. The timed belt 17 is subsequently stopped again. The object 4 then remains in the position shown in FIG. 4.

The procedure described above is now repeated with two additional objects 4. The two objects transferred previously are also moved downwardly on the timed belt 17 by a step of the timed belt 17. The light barrier 21 preferably determines the length of the object on the braking belt 12 and the timed belt 17 is actuated accordingly. Thus, in the case of long objects, the step of movement of the timed belt 17 is longer than when the objects are smaller. Consequently, the objects 4 and 4' and the subsequent objects are moved downwardly in a step by step operation toward the outlet 19. When the frontmost objects 4 and 4' have reached the position shown in FIG. 5, the presence of these objects at the end of the timed belt 17 is indicated by the light barrier 22. Appropriate signals now indicate that the transfer unit 10 is filled. However, an additional filling at least in the area of the braking belt 12 is still possible.

FIG. 6 of the drawing shows the installation 1 with several transfer units 10. As shown in FIG. 6, depending on the size of the objects 4, a single or a double row of objects can be placed on the transfer units 10. Alternating single or double rows on the transfer units 10 are also possible. Of course, it is also possible to only partially fill the transfer units 10.

FIG. 6 shows an operator 33 who removes an object 4 from a transfer unit 10 and transfers it to another conveyor unit 34. Since the respectively lowermost objects are freely placed on the transfer units 10 and do not rest against a stop, these objects can be easily grasped and conveyed by the rollers 20.

The invention is not limited by the embodiments described above which are presented as examples only but can be modified in various ways within the scope of protection defined by the appended patent claims.

We claim:

1. An installation for commissioning objects comprising a conveyor and at least one transfer unit for transferring the objects from the conveyor, wherein the at least one transfer unit is arranged approximately at a right angle relative to the conveyor, the conveyor comprising a plurality of carriages connected to one another in an articulated manner, each carriage having a support plate for an object, the support plate being tiltable for feeding an object to the at least one transfer unit, the at least one transfer unit having an inlet for receiving the objects from the conveyor and an outlet for discharging the objects, wherein the at least one transfer unit is inclined so that the inlet is located at a higher level than the outlet, the at least one transfer unit being configured to receive objects between the inlet and the outlet, the at least one transfer unit further comprising a timed belt in front of the outlet and at least one additional belt in front of the timed belt for receiving at least one object and transferring the at least one object to the timed belt in a controlled manner.

2. The installation according to claim 1, wherein the at least one additional belt is a braking belt.

3. The installation according to claim 2, further comprising a pulling belt mounted following the inlet.

4. The installation according to claim 3, wherein the pulling belt and the braking belt each have an outer surface, and wherein the outer surface of pulling belt has a relatively strong adhesiveness and the outer surface of the braking belt has a relatively significantly weaker adhesiveness.

5. The installation according to claim 3, wherein the braking belt and the pulling belt each have a travel speed, wherein the travel speed of the braking belt is substantially slower than the travel speed of the pulling belt.

6. The installation according to claim 3, wherein the pulling belt, the braking belt and the timed belt each have a length, and wherein the length of the pulling belt and/or the length of the braking belt are each substantially shorter than the length of the timed belt.

7. The installation according to claim 1, wherein the timed belt has an inlet, further comprising a barrier mounted in front of the inlet of the timed belt for determining the presence of at least one object in front of the timed belt.

8. The installation according to claim 7, wherein the barrier is a light barrier.

9. The installation according to claim 1, wherein the timed belt has an outlet, further comprising a barrier mounted at the outlet of the timed belt for determining the presence of at least one object at the outlet of the timed belt.

10. The installation according to claim 9, wherein the barrier is a light barrier.

11. The installation according to claim 1, wherein the inlet of the transfer unit comprises laterally mounted guide walls.

12. The installation according to claim 1, wherein the conveyor has at least two discharge positions located successively in a conveying direction of the conveyor, the at least one transfer unit having first and second sides, wherein the discharge positions are configured to move the objects alternatingly onto the first and second sides of the transfer unit.

* * * * *